(12) United States Patent
Fredberger et al.

(10) Patent No.: US 8,371,910 B2
(45) Date of Patent: Feb. 12, 2013

(54) PACKAGING EQUIPMENT AND PROCESS FOR CONTROLLING OF THE PACKAGING EQUIPMENT

(75) Inventors: Gerd Fredberger, Auerbach (DE); Ralf Schmalfeld, Brüggen (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 701 days.

(21) Appl. No.: 12/503,928

(22) Filed: Jul. 16, 2009

(65) Prior Publication Data

US 2010/0112922 A1    May 6, 2010

(30) Foreign Application Priority Data

Jul. 18, 2008  (DE) .......................... 10 2008 033 800

(51) Int. Cl.
 *A22C 11/00*   (2006.01)

(52) U.S. Cl. ........................................................ 452/40

(58) Field of Classification Search .............. 452/30–32, 452/35–38, 46–48, 51
See application file for complete search history.

(56) References Cited

U.S. PATENT DOCUMENTS

| 4,813,205 | A | | 3/1989 | Mikata et al. | |
|---|---|---|---|---|---|
| 5,816,903 | A | * | 10/1998 | Idziak | 452/49 |
| 6,117,003 | A | * | 9/2000 | Brinson | 452/31 |
| 7,637,804 | B2 | * | 12/2009 | Jackel | 452/31 |

FOREIGN PATENT DOCUMENTS

| DE | 36 17 560 C2 | 11/1987 |
|---|---|---|
| DE | 690 15 293 T2 | 7/1995 |
| DE | 1 763 999 A1 | 3/2007 |
| DE | 20 2006 000 282 U1 | 6/2007 |

* cited by examiner

*Primary Examiner* — Richard Price, Jr.
(74) *Attorney, Agent, or Firm* — Hahn Loeser & Parks LLP; Bret A. Hrivnak, Esq.

(57) ABSTRACT

A packaging device including a filling unit for transporting a filling material, a filling tube connected to said filling unit, for introducing the filling material supplied by the filling unit into a tubular casing and for ejecting the filling material located in the casing, a clipping unit disposed in the direction of transport of the filling unit, for constricting the casing at a predetermined position and for closing the casing with at least one closure element, a sensor unit disposed between the filling unit and the filling tube, for detecting impurities in the filling material and for emitting a detection signal to a control unit, wherein the control unit has a control connection to the clipping unit. The invention also relates to a method for controlling a packaging device.

17 Claims, 3 Drawing Sheets

PACKAGING EQUIPMENT AND PROCESS FOR CONTROLLING OF THE PACKAGING EQUIPMENT

BACKGROUND OF THE INVENTION

The present invention relates to a packaging device, and in particular to a packaging device in which a filling material is introduced into a tubular casing, and to a method for controlling a packaging device.

A packaging device known from practice, in which a filling material is introduced into a tubular casing, is shown in FIG. 3. Such a packaging device can be used to produce sausages, for example.

The packaging device in FIG. 3 comprises a mostly funnel-shaped filling container or storage container for the liquid, pasty and/or granular filling material, which may, for example, be sausage meat for producing sausages. The filling material 2 is supplied to a filling unit 4. Filling unit 4, also referred to as a filler, causes filling material 2 to be ejected via a connecting pipe 5 to a valve unit 6. A filling tube 7, on which a tubular casing 8 closed at one end by means of a closure element is arranged, is connected to valve unit 6. Casing 8 is pulled in folded form from a respective supply onto at least one part of filling tube 7, and the casing end with the closure is pulled over the end of filling tube 7.

If, during operation of the packaging device, filling material 2 is transported under a predetermined pressure from storage container 1 in the direction of filling tube 7 by means of filling unit 4, then the filling material 2 is introduced into casing 8. That part of casing 8 which is filled with the filling material 2 is transported to a clipping unit 9 disposed in the direction of flow of the filling material.

Portioning is carried out in clipping unit 9 according to a predetermined filling capacity (portion size, product size) in casing 8, by the filling material being displaced in a predetermined region of casing 8 by displacement devices (not shown in FIG. 3), and by the clipping unit 9 placing two spaced-apart closure elements (not shown), such as clips, in the resultant displacement region which is in the form of an unstuffed tress, such that casing 8 is closed and the constricted part of casing 8 can be severed between the closure elements.

The individual sausage products are removed after they leave clipping unit 9, and are transported for further processing to the respective processing positions.

The packaging device further comprises a sensor unit 10, which is provided in the form of a detector for detecting impurities in filling material 2. In particular, any pieces of metal that have been undesirably introduced into filling material 2 are detected. Sensor unit 10 emits a corresponding detection signal, which is supplied to a central control unit 11 for further processing and evaluation.

When filling material 2 is being processed, and particularly during mixing and comminution of components of filling material 2, it is possible, for example, that parts of the metal tools for comminuting the components of filling material 2 can be damaged and break off. The pieces of metal which have broken off, for example parts made of light metal such as aluminum, or made of steel, are transported in the volumetric flow of filling material 2, the direction of volumetric flow in FIG. 3 being indicated by respective arrows 12 in connecting pipe 5.

If, during operation of the packaging device, filling material 2 is contaminated by such metal parts, then these metal parts may end up in the finished product (for example in a sausage), which means that the product may be hazardous for the final consumer eating the product. Such metal parts are likewise hazardous in view of the fact that the product packaged in portions in casing 8, for example, is further processed in another processing operation. In that case, apparatus and machinery provided for further processing may be damaged.

The pre-processed filling material 2 stored in container 1 is fed past the sensor unit 10 into the connecting pipe 5 under a pressure produced by filling unit 4, such that a metal part can be detected by means of the relevant known measurement methods.

If a metallic impurity in filling material 2 is detected by sensor unit 10, control unit 11 emits a corresponding alarm for the operator of the packaging device and induces shut-down of filling unit 4, so that no further filling material 2 is transported in an uncontrolled manner in the direction of valve unit 6 and filling tube 7, and hence to prevent the impurity from entering the finished product.

After a metallic impurity has been detected in filling material 2, it is necessary for measures to be carried out manually by an operator. After detection of the metal impurity by sensor unit 10 and shut-down of the filling unit 4 by operating personnel, or automatically, valve unit 6 may be switched such that any filling material 2 transported to valve unit 6 is not fed to filling tube 7 but to a discharge pipe 13 and that filling unit 4 is manually operated for a predetermined duration, and that the part of filling material 2 which contains the metal impurity is ejected via discharge pipe 13 into an appropriate container 14. The amount of filling material 2 to be ejected, i.e. the amount of filling material 2 that is not fed to filling tube 7 and hence for processing into the final product, but instead is discharged into container 14, depends on the stuffing speed resulting from the volumetric flow generated by filling unit 4. In general, a relatively large amount of filling material 2 is ejected, in order to be certain that the metal impurity is ejected.

The filling material 2 thought to contain the metallic impurity is thus ejected in a time-dependent manner according to an adjustable time associated with the predefined volumetric flow rate of filling unit 4, on the one hand, or ejection can be carried out in such a way that the ejected amount corresponds to a number of portions set on filling unit 4 (pre-adjusted amount of product).

It is also possible that direct ejection is not carried out after a metallic impurity is detected by sensor unit 10, but that connecting pipe 5 and valve unit 6 are manually cleaned instead. To do this, the device must be partially disassembled manually and re-assembled. After operation of the entire portioning and packaging device is temporarily discontinued, it is also necessary to put the device back into operation.

However, such handling is very laborious and time-consuming and leads to the undesirable and protracted stoppage of the device. Manual intervention is also required, wherein disassembly and re-assembly of the device or at least parts thereof can be dangerous for the operating personnel.

Ejecting part of filling material 2 after detection of a metallic impurity means increased loss of filling material, since a larger amount of filling material must be ejected to ensure that the contaminated filling material is definitely ejected. Hence, in addition to the extended period that operation of the device is discontinued, substantial amounts of filling material 2 are also lost.

SUMMARY OF THE INVENTION

The object of the present invention is therefore to design a packaging device of the kind initially specified in such a way that a metallic impurity is reliably detected, while preventing any major loss of filling material and extended periods in which operation of the device is discontinued.

The invention thus relates to a packaging device comprising a filling unit for transporting a filling material, a filling tube connected to said filling unit, for introducing the filling material supplied by the filling unit into a tubular casing and for dispensing the product thus formed, a clipping unit disposed in the direction of transport of the filling unit, for constricting the casing at a predetermined position and for closing the casing with at least one closure element, a sensor unit disposed between the filling unit and the filling tube, for detecting impurities in the filling material and for emitting a detection signal to a control unit, wherein the control unit has a control connection to the clipping unit.

This ensures that a metallic impurity, in particular, can be reliably detected in the filling material. The volumetric flow of the filling material passes the sensor unit, and a corresponding detection signal is supplied to the control unit. The control unit likewise controls the operation of the clipping unit. According to the invention, a data and/or control connection is provided for this purpose between the control unit and the clipping unit, such that the clipping unit can be controlled by means of the controller, and more particularly in an operationally dependent manner.

The control unit can also actuate the clipping unit such that a product with a predetermined product size is formed when the detection signal is no longer received, and actuate the clipping unit when the detection signal is present, such that a product size is generated which is larger or smaller than the predetermined product size.

Depending on the detection signal being outputted from the sensor unit, a signal can thus be supplied to the clipping unit such that the clipping unit adopts a predetermined operating mode with a correspondingly defined operating behavior. The special operating mode of the clipping unit, which is set by the control unit depending on detection of the impurity, serves to designate a specific amount of product in a special manner such that said amount of product differs reliably in its arrangement and appearance from the product resulting from normal troublefree operation. The product modified by the changed operating behavior resulting from actuation by the control unit can be identified as the product in which the impurity is definitely located, so the contaminated region of the filling material is not ejected with substantial losses and production stoppages in the course of normal further processing of the product, and particularly during normal and troublefree product throughput, but instead is passed through the device in a predetermined, precisely defined manner. In this way, controlled, detection-based actuation of the clipping unit such that it enters a particular operating state or operating mode causes a change in the shape and arrangement of the product, with the result that a region of the product containing the metallic impurity can be distinguished with a very high level of probability from the uncontaminated products.

With the device according to the invention, it is therefore possible to detect a metallic impurity reliably, and, without interrupting the production process, i.e., the operation of the device as a whole, to mark a part of the product in such a way that the impurity can be unambiguously associated with this marked part of the product. There is no necessity to use other devices or methods in order to apply a special marking.

During operation of the filling unit, the control unit is able to actuate the clipping unit in a predetermined manner when the detection signal from the sensor unit is present, such that the clipping unit discontinues operation.

Discontinuing the operation of the clipping unit includes discontinuing at least one of the functions of portioning, closing using a closure element and performing a separating cut in order to form the predetermined product size.

The control unit is able to actuate the clipping unit to discontinue its operation for a predetermined duration that is greater than the duration required to form the predetermined product size.

The control unit is able to actuate the clipping unit to discontinue its operation during operation of the filling unit, in order to form a predetermined number of products with the predetermined product size.

The device may also have a valve unit disposed between the sensor unit and the filling tube and provided to channel the filling material provided by the filling unit either to a filling tube for forming the product, or to a discharge pipe, disposed on the valve unit, for discharging the filling material, depending on the control exercised by the control unit.

The device may also have a closable opening disposed between the filling unit and the sensor unit, for supplying predetermined test elements for testing the functioning of the sensor unit.

The present invention also relates to a method for controlling a packaging device, said method comprising the steps: transporting a filling material in a volumetric flow through a filling tube into a tubular casing and outputting the filling material located in the casing, constricting the filled casing at a predetermined position and closing the casing with at least one closure element to form a product having a predetermined product size, detecting an impurity in the filling material and outputting a detection signal to a control unit, and forming a control connection between the control unit and the clipping unit for actuating the clipping unit.

The method may also include the step of actuating the clipping unit in response to emission of the detection signal, in a predetermined manner to form a product size that is larger or smaller than the predetermined product size.

The method may also include the step of actuating the clipping unit during operation of the filling unit when the detection signal is present, such that the clipping unit discontinues operation.

Discontinuing operation of the clipping unit may include discontinuing at least one of the functions of portioning, closing using the closure element and performing a separating cut in order to form the predetermined product size.

The method may also include the step of actuating the clipping unit to discontinue its operation for a predetermined duration that is greater than the duration required to form the predetermined product size.

The method may also include the step of actuating the clipping unit to discontinue its operation during operation of the filling unit in order to form a predetermined number of products having the predetermined product size.

The method may also include the step of suppressing filling unit operation, emitting an alarm signal and shutting down the device.

The method may also include the step of ending operation of the filling unit, when the detection signal is present, with an adjustable delay until filling unit operation actually ends.

The method may also include the step of inserting test elements into the volumetric flow and testing the detection of the test element by means of the sensor unit.

The present invention shall now be described in detail on the basis of embodiments and with reference to the Figures, in which:

DETAILED DESCRIPTION OF THE INVENTION

Figure 1:
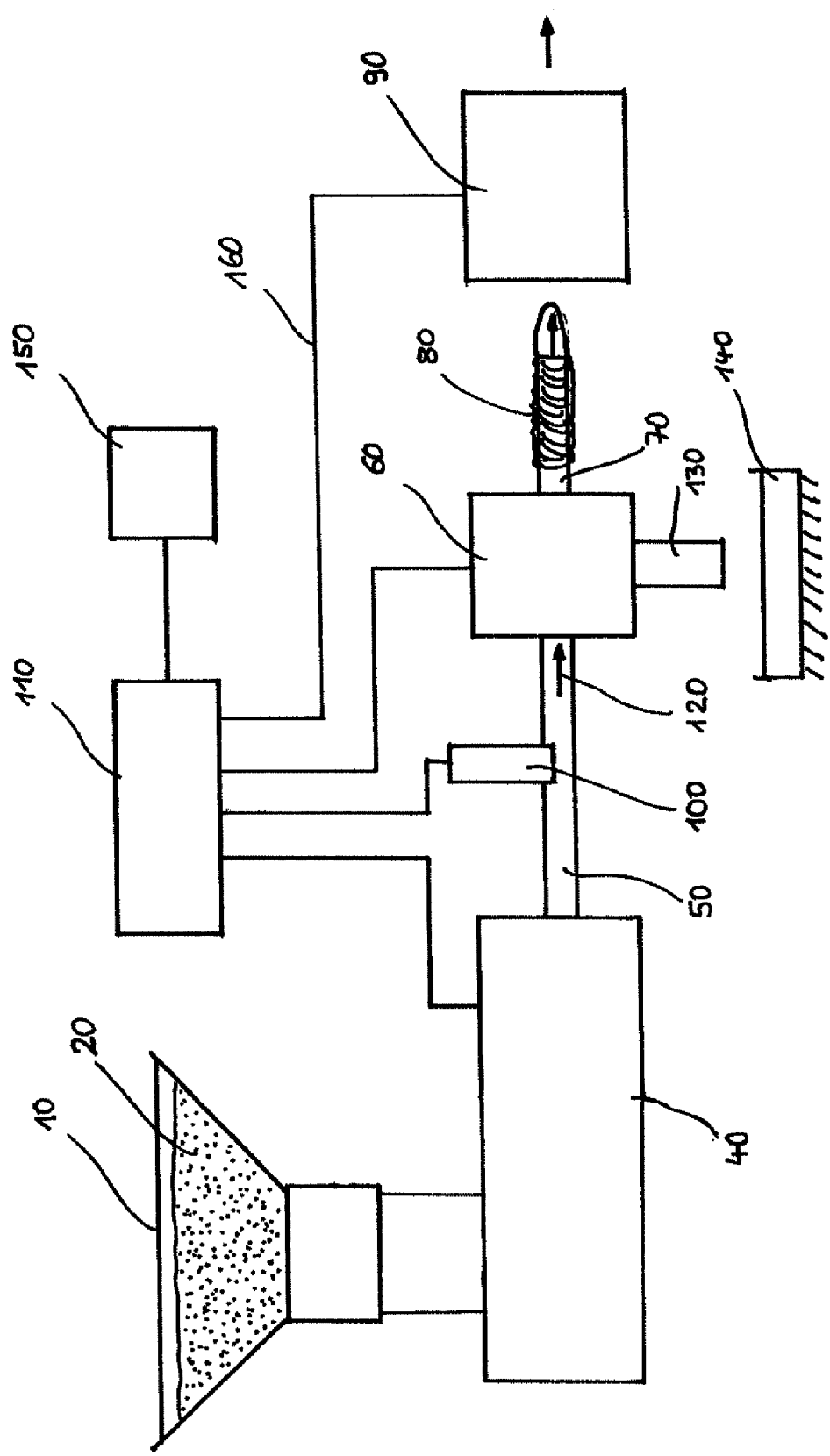
FIG. 1 shows an overall view of the packaging device according to one embodiment of the present invention.

FIG. 1 shows a schematic view of the arrangement of a packaging device according to the present invention.

According to FIG. 1, a filling material 20 located in a container 10 is fed to a filling unit 40, which for its part generates, with a predetermined pressure, a volumetric flow that feeds filling material 20 to a valve unit 60 via a connecting pipe 50. By means of a filling pipe 70 disposed on valve unit 60, onto which filling pipe a predetermined amount of a casing 80 for packaging filling material 20 is arranged, the casing 80 closed on one side at a particular place is stuffed with filling material 20. Stuffed casing 80 is fed to a clipping unit 90 disposed in the direction of movement of stuffed casing 80, in which clipping unit the portioning is carried out by respective displacement devices in the manner described above with reference to FIG. 3, wherein a predetermined amount of the filling material 20 is disposed in casing 80 and is portioned by the displacement devices in such a way that a constriction or an unstuffed tress of casing 80 is formed between the portions. In the region of the unstuffed tress of casing 80, the amount of filling material 20 portioned in casing 80 is closed on both side by clipping unit 90, in that closure elements or clips are fixed to casing 80, after which the individual product parts located in the constricted region between the closure elements are severed by clipping unit 90. A predetermined product size corresponding to the set portion size (amount of filling material) is achieved.

In the same way as was described with reference to FIG. 1, filling material 20 is monitored by means of a sensor unit 100, by which any metallic objects (metal parts) undesirably contained in filling material 20 can be detected.

Respective output signals from sensor unit 100 or from the metal detector are supplied to a central control unit 110 so that the respective operations can be triggered on the basis of the detection signals received from sensor unit 100 and after said signals have been processed accordingly by control unit 110. Control unit 110 may also be an integral component of clipping unit 90.

If an impurity in filling material 20 is detected in connecting pipe 50 after the volumetric flow has passed in the stated direction (arrows 120), then a corresponding amount of filling material can be ejected, in the same manner as in the prior art, by switching valve unit 60 accordingly. The volume of filling material 20 to be ejected is guided by means of a discharge pipe 130 into a container 140.

To control predetermined measures and in particular the packaging device as a whole, control unit 110 is connected to a display and operating panel 150. On said display and operating panel 150, operation modes and set operating conditions can be displayed for the user of the device, and by pressing the relevant input keys or by means of a menu the user can also control the device manually, semi-automatically or automatically and can specify the respective operating parameters. Operating parameters can also be stored in a memory device in control unit 110, particularly with regard to detection by sensor unit 100.

Figure 3:
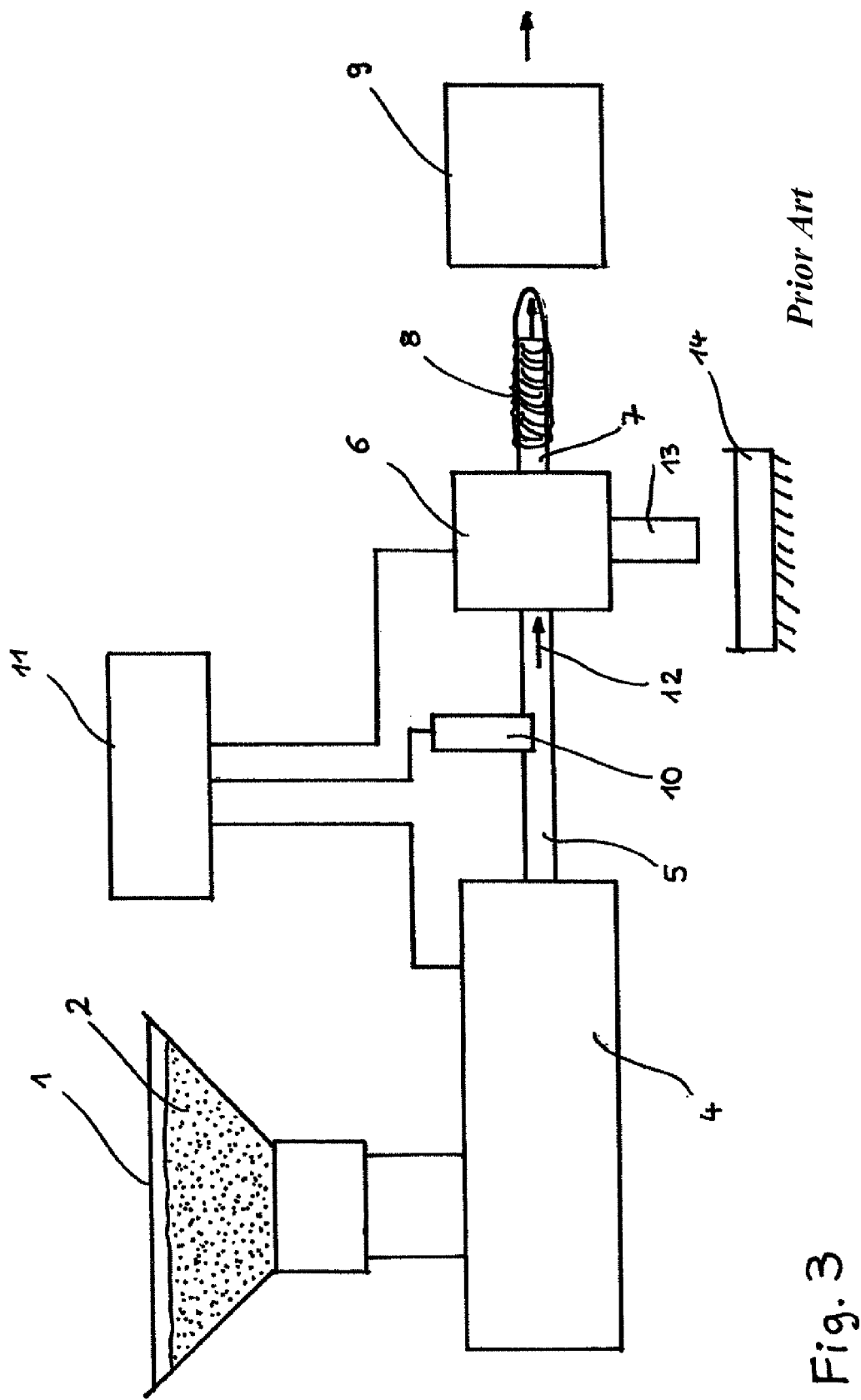
FIG. 3 shows a schematic view of a prior art packaging device.

In comparison to the arrangement according to FIG. 3, the arrangement of the inventive device according to FIG. 1 includes a data connection or control connection 160 between control unit 110 and clipping unit 90. By means of said control connection 160, which can be wired or wireless, commands for a particular form of operation can be supplied by control unit 110 to clipping unit 90, and data can be transferred from clipping unit 90 to control unit 110 that describe the operation of clipping unit 90 as well as set parameters and operating conditions, in particular. Thus, clipping unit 90 has an interface to control unit 110.

The inventive device according to FIG. 1 is thus able to perform the functions and to adopt the operating states that were described for the prior art with reference to FIG. 3. This relates, in particular, to the ejection of an amount of filling material 20 in the event that a metallic impurity is detected by means of sensor unit 100. Control unit 110 can therefore eject an amount of material into container 140, depending on the current set operating conditions, by switching valve unit 60.

The device according to the invention is therefore able to adopt additional operating modes, in addition to ejection as a function of time, wherein after detection of a metallic impurity the product is ejected by means of valve unit 60 during an adjustable time period, and ejection as a function of portion size, wherein a number of portions of the product adjustable at filling unit 40 is ejected after detection of a metallic impurity. In detail, control unit 110 controls the entire device in order to provide the additional operating modes.

In FIG. 1, control unit 110 is shown as being separate from any of the components of the device. As already stated in the foregoing, control unit 110 is preferably disposed in clipping unit 90, so that, when operating clipping unit 90, the entire device can also be controlled via control unit 110. In particular, valve unit 60 for ejecting filling material can be controlled by clipping unit 90 (or by control unit 110 disposed therein).

In detail, after a metallic impurity has been detected in filling material 20 by sensor unit 100, a signal is given to control unit 110, at which control unit 110 actuates clipping unit 90, in particular, in a predetermined manner corresponding to at least one of the additional operating modes, in response to emission of said detection signal.

The possibilities of ejecting on a time basis or a portion basis defines a first operating mode.

In a second operating mode, ejection is not carried out by adjusting valve unit 60, but the filling material 20 containing a metallic impurity is likewise passed through the device. According to a first option of the second operating mode, pass-through is carried out as a function of time, wherein stuffing of filling material 20 is continued for an adjustable time period. In this context, filling unit 40 is actuated in such a way that a corresponding amount of filling material 20, as a function of time, can be stuffed into casing 80 by means of filling tube 70. During this period of passing the filling material through the device, clipping unit 90 is actuated in such a manner by control unit 110 that generation of an unstuffed tress, closure of the product by means of respective closure elements and severing of the product in the constricted region of casing 80 between the closure elements disposed there is suppressed. During this predetermined period, clipping unit 90 does not receive any clip signal, which means that its functions are suppressed.

Due to the suppression of these functions of clipping unit 90 and the continued operation of filling unit 40, a product ensues which has a larger volume than the preset portion volume, with the result that a longer sausage, for example, is produced in which the filling material 20 containing the detected metal part is located, wherein this longer and hence clearly identifiable product can easily be removed. An alternative option is to form a product which has a smaller volume than the preset portion volume, with the result that a shorter sausage, for example, is produced in which the filling material 20 containing the detected metal part is located, wherein this shorter and hence clearly identifiable product can easily be removed.

The product to be removed is therefore characterized by its having a greater or smaller length, and by the greater or smaller portion volume resulting from the temporarily discontinued operation of clipping machine 90. The product size is therefore larger or smaller than a predetermined product size corresponding to a product with the preset portion size.

As another option within the second operating mode, the filling material can be passed through the device on a portion basis, and no filling material 20 is ejected via valve unit 60 and discharge pipe 130. Instead, the filling material 20 contaminated with the detected metal part is passed through the device, wherein a preset (predetermined) number of portions of the product is formed which correspond to the preset portion size (portion volume, predetermined product size). In this way, stuffing of casing 80 continues in the preset manner after detection of the metallic impurity.

However, during this portion-based passing of the filling material through the device, and after the detection signal is supplied by sensor unit 10, clipping unit 90 is actuated by control unit 110 in a predetermined manner in order to reach a product size that is larger than the predetermined product size (single portion). This actuation has the effect that the product is portioned by clipping unit 90 in the normal manner and hence that constrictions are formed in casing 80. However, clipping unit 90 is actuated in such a way that both attachment of the closure elements in the constricted region and severing of the product in the constricted region (applying separating cuts) is suppressed.

A longer product (which is longer than the predetermined product size) thus ensues, for example a sausage longer than the length of the predetermined number of portions, but in which no closure elements and no separating cut are provided. In this way, the filling material 20 containing the metallic impurity is likewise stuffed into casing 80 in the usual way, but the predetermined number of portions (single portions), of which one contains the impurity, is distinguished from defect-free product by the suppression of closure and severing.

In both of the cases of second operating mode described in the foregoing, the predetermined period can determine the time-based pass-through, or the number of portions can be determined according to the volumetric flow generated by filling unit 40 in the case of portion-based passing of the filling material through the device. These additional parameters for pass-through may be set according to the dimensions and operating parameters of the device. In either case, closure and severing of the longer product is carried out at the beginning and at the end of temporary suppression of operation of clipping unit 90, with the result that said product can be recognized and separated from the other, uncontaminated products.

In this way, it is possible for the contaminated product to be passed through the device without discontinuing operation of the entire device, and for product parts containing the contamination to be marked by actuating the clipping unit 90 accordingly, so that they can be removed easily.

Operation of the packaging device includes a third operating mode, in which filling material is passed through with suppression of stuffing and emission of an alarm signal. After a metallic impurity has been detected by means of sensor unit 100, the packaging device is stopped by means of control unit 110, wherein filling unit 40 and clipping unit 90 are stopped. An alarm signal for the operating personnel is emitted. The operating personnel then operates clipping unit 90 manually and sets a first closure element (clip) at a predetermined place in casing 80. After that, filling unit 40 is restarted, and a volumetric flow in the direction of arrows 120 in FIG. 1 is again formed by filling unit 40 (Auto-On). During a predetermined (adjustable) period, a portion is stuffed into casing 80, and filling unit 40 is then stopped again. The operating personnel places the first closure element by manually operating clipping unit 90, so that a marked product is formed in a predetermined manner by manual intervention by the operating personnel, which product can be removed after clipping device 90 has applied a corresponding separating cut. Due to the device being stopped immediately after detection of the metallic impurity, said product contains said metal part. After the product which has been marked in this way has been removed, the operating personnel can switch on the packaging device and put it into operation for further automatic production (Auto-On).

In this way, it is possible to pass through a very small loss amount of filling material 20 and to remove it subsequently. Hence, with this manual intervention by the operating personnel, a predetermined portion is stuffed into casing 80, wherein clipping unit 90 is manually operated to apply the closure elements and the separating cuts.

In the fourth operating mode of the packaging device, portion-based passing of the filling material through the device is carried out after detection of a metallic impurity, wherein stuffing is suppressed, an alarm signal is emitted and the device is stopped. An operator applies a first closure element (clip) to casing 80 at filling tube 70 by manually operating clipping unit 90, after which filling unit 40 is started (Auto-On). A normal stuffing operation is carried out by operating filling unit 40, wherein a predetermined adjustable number of portions is stuffed until the filling unit 40 is once again stopped. A first closure element (clip) is thus applied, and after the product (for example the sausage) has been removed according to the predetermined number of portions, continued production is reset by the usual automatic method (Auto-On).

In a fifth operating mode, beginning with automatic troublefree operation of the packaging device, filling unit 40 is stopped when a metallic impurity is detected in filling material 20 by means of sensor unit 100, with an adjustable delay in combination with a known path and a known speed. This results in a situation in which filling unit 40 is not stopped immediately, but in which the filling operation is continued during the adjustable delay, so that the place with the impurity (the place where the metallic impurity is located in filling material 20), combined with the continued volumetric flow, can be passed through the device and brought near the ejection point in valve unit 60 or at the end of filling tube 70. In this way, the amount of filling material lost can be reduced, because when the impurity is ejected it is located in the immediate vicinity of valve unit 60 and preferably inside valve unit 60, and hence a smaller ejection volume is required in order to eject the impurity. Furthermore, when the filling material is passed through the device, the impurity is already located at the end of filling tube 70, with the result that with the next portion an amount of filling material 20 corresponding to one portion can be put into casing 80 in the normal manner.

The fifth operating mode described in the foregoing can be combined with the operating modes described in the foregoing, since both ejection and pass-through can be carried out on a time basis as well as on the basis of a predetermined number of portions.

According to a sixth operating mode of the packaging device according to the invention, the filling unit is briefly stopped after an ejection of material (filler stop), so that valve unit 60 can be switched under normal pressure. This relates, in particular, to the preferential configuration of valve unit 60 with a ball valve, so that it can be adjusted under normal pressure. This also prevents further stuffing from being carried out against the closed displacement devices of clipping unit 90, in certain situations after the packaging device has been restarted. By this means, the device is started more slowly, thus preventing damage to filling material 20 and casing 80.

A second embodiment of the present invention shall now be described with reference to FIG. 2.

Figure 2:
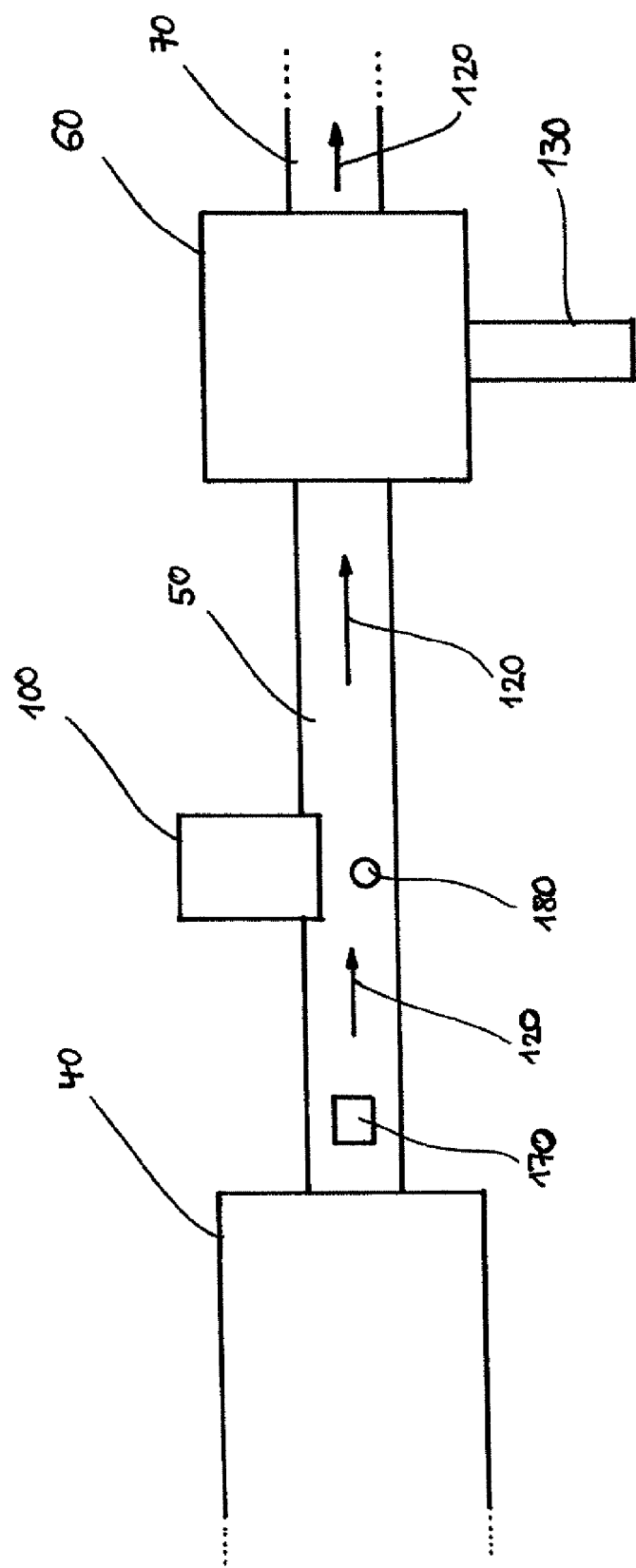
FIG. 2 shows a part of the packaging device shown in FIG. 1, according to a second embodiment of the present invention.

FIG. 2 shows, in a schematic view, a part of the arrangement in FIG. 1, showing filling unit 40, connecting pipe 50, valve unit 60 with filling tube 70 disposed thereon and with discharge pipe 130 and with sensor 100 disposed in connecting pipe 50. Arrows 120 designate the controlled direction of the volumetric flow of filling material 20 (FIG. 1) that is transported by means of filling unit 40. The data connections between the components specified above and control unit 110 are not shown in order to simplify depiction.

Sensor unit 100 in FIG. 2 is used in the same manner as sensor unit 100 in FIG. 1 to detect impurities, and metal impurities in particular. In the event that a metallic impurity is detected, sensor unit 100 emits a corresponding detection signal to control unit 110.

Hence, reliable detection of an impurity in filling material 20 is only assured when sensor unit 100 functions without disruption. To ensure the operability of sensor unit 100, a functional test of sensor unit 100 must therefore be carried out. In one known method, test rods containing metallic or metal parts are used, but all that can be measured is purely the detection function of sensor unit 100. However, confirmation that sensor unit 100 can reliably detect metallic impurities does not permit any reliable conclusions to be drawn as to whether a detected metallic impurity has also been removed (for example by ejection). One problem, and a safety disadvantage, in particular, consists in the fact that the power supply to the entire device is not disconnected when sensor unit 100 has been dismounted from the device.

For this purpose, connecting pipe 50 is provided with an opening between filling unit 40 and sensor unit 100 that is closed by means of a closing lid 170 during normal trouble-free operation. When closing lid 170 is open, the interior of connecting pipe 50 is then accessible. It is possible thereby to insert predetermined test elements (test bodies) 180 into connecting pipe 50, such that these are carried along in the volumetric flow of filling material 20 in the direction indicated by arrows 120. In particular, test element 180 is guided with the volumetric flow past sensor unit 100, and the metal part of test element 180 is recognized by means of sensor unit 100 when the latter is working faultlessly, and a corresponding detection signal is emitted to control unit 110. In such a case, it is possible to carry out an operation according to the second operating mode, so that filling material is passed through the device in a time-based or portion-based manner, and wherein test element 180 must be contained in the correspondingly marked product (larger than the predetermined product size). This can likewise be checked, more specifically, by means of an additional testing device, not shown, with which it is possible to determine whether the times for time-based pass-through, or the number of portions for the portion-based pass-through, are correctly and adequately adjusted so that the impurity (test element 180 in this case) is detected reliably and with certainty.

In the same way, it can be determined by means of a test element 180 or a plurality of test elements whether test element 180 (the simulated impurity) has also been actually ejected, in the ejection case.

By opening closing lid 170, inserting one or several test elements 180 and reclosing closing lid 170, it is thus possible, in a simple manner, to carry out a test that includes not only the operability of sensor unit 100 as such, but also the correct adjustment of the operating parameters (stipulated period and stipulated number of portions to be ejected or passed through the device). By carrying out such checks using test elements 180 and with simple insertion of test elements 180 using the opening in connecting pipe 50, it is therefore possible, as a safety precaution for operation of the inventive device, to simulate an impurity and to reliably check the separation of a contaminated product or the ejection of product containing the impurity.

Test elements 180 preferably consist of a plastic ball with an enclosed metal core.

In the packaging device according to the invention, valve unit 60 is actuated with compressed air in order to switch it. A ball valve preferably contained in valve unit 60 is actuated directly by compressed air, wherein the packaging device comprises a safety connection for compressed air. The compressed air for actuating valve unit 60 and especially the ball valve contained therein can only be connected when sensor unit 100 is connected to clipping unit 90. This avoids the problem that it is possible to reach into the ball valve and to switch it when no sensor device 100 is installed, since the electric control has not yet been connected. The entire sensor unit 100 can be taken out of the device. In that case, the compressed air is inevitably disconnected, with the result that even unintentional starting of the device is not possible.

In the prior art, clipping unit 90 operates without an electrical interface to the other components of the device, and more particularly to central control unit 110. Instead, clipping unit 90 operates autonomously.

Sensor unit 100 according to FIGS. 1 and 2 has been described in the foregoing in connection with the detection of metallic impurities. Depending on the type of detection and the configuration of sensor unit 100, it is possible to detect other impurities, so the invention is not limited to the detection of metallic impurities.

The present invention has been described in the foregoing with reference to preferred embodiments and to the associated Figures. However, it is self-evident that the configuration of the present invention according to the Figures described in the foregoing, and the reference signs used for the respective parts and components in the Figures, the description and the claims, and the details provided by way of example are not to be interpreted in a restrictive sense. Rather, all embodiments and variants which come under the enclosed claims are considered to belong to the invention.

The invention claimed is:

1. A packaging device, comprising
   a filling unit for transporting a filling material,
   a filling tube connected to said filling unit for introducing the filling material supplied by the filling unit into a tubular casing and for dispensing the product thus formed;
   a clipping unit disposed in the direction of transport of the filling unit, for constricting the casing at a predetermined position and for closing the casing with at least one closure element;
   a sensor unit disposed between the filling unit and the filling tube, for detecting impurities in the filling material and for outputting a detection signal to a control unit; and
   the control unit has a control connection to the clipping unit, said control connection actuating the filling unit in such a way that a corresponding amount of the filling material, as a function of time, can be stuffed into the casing by means of the filling tube.

2. The device of claim 1, wherein the control unit actuates the clipping unit such that a product with a predetermined product size is formed when the detection signal is no longer received, and when the detection signal is present actuates the clipping unit such that a product size is generated which is larger or smaller than the predetermined product size.

3. The device of claim 1, wherein the control unit actuates the clipping unit in a predetermined manner when the detection signal from the sensor unit is present during operation of the filling unit, such that the clipping unit discontinues operation.

4. The device of claim 3, wherein discontinuing the operation of the clipping unit includes discontinuing at least one of the functions of portioning, closing by means of a closure element and performing a separating cut in order to form the predetermined product size.

5. The device of claim 4, wherein the control unit actuates the clipping unit to discontinue its operation for a predetermined duration that is greater than the duration required to form the predetermined product size.

6. The device of claim 4, wherein the control unit actuates the clipping unit to discontinue its operation during operation of the filling unit in order to form a predetermined number of products with the predetermined product size.

7. The device of claim 1, further comprising:
a valve unit disposed between the sensor unit and the filling tube and provided to channel the filling material provided by the filling unit either to a filling tube for forming the product, or to a discharge pipe, which is disposed on the valve unit, for discharging the filling material, depending on the control exercised by the control unit.

8. The device of claim 1, further comprising:
a closable opening disposed between the filling unit and the sensor unit, for supplying predetermined test elements for testing the functioning of the sensor unit.

9. A method for controlling a packaging device, comprising the steps:
transporting a filling material in a volumetric flow through a filling tube into a tubular casing and dispensing the filling material located in the casing;
constricting the filled casing at a predetermined position and closing the casing with at least one closure element to form a product having a predetermined product size in a clipping unit;
detecting impurities in the filling material and emitting a detection signal to a control unit; and
establishing a control connection between the control unit and the clipping unit for actuating the clipping unit.

10. The method of claim 9, further comprising:
the step of actuating the clipping unit, in response to emission of the detection signal, in a predetermined manner to form a product size that is larger or smaller than the predetermined product size when the detection signal is present, and to form a product size corresponding to the predetermined product size when the detection signal is not present.

11. The method of claim 10, further comprising:
the step of actuating the clipping unit to discontinue its operation for a predetermined duration that is greater than the duration required to form the predetermined product size.

12. The method of claim 10, further comprising:
the step of actuating the clipping unit to discontinue its operation during operation of the filling unit, in order to form a predetermined number of the predetermined product size, wherein discontinuing the operation of the clipping unit includes at least one of the functions of portioning, closing using a closure element and performing a separating cut in order to form the predetermined product size.

13. The method of claim 9, further comprising:
the step of actuating the clipping unit during operation of the filling unit when the detection signal is present, such that the clipping unit discontinues operation.

14. The method of claim 13, wherein discontinuing the operation of the clipping unit includes discontinuing at least one of the functions of portioning, closing using the closure element and performing a separating cut in order to form the predetermined product size.

15. The method of claim 10, further comprising:
suppressing of filling unit operation, the emission of an alarm signal and shutting down the device.

16. The method of claim 9, further comprising:
the step of ending operation of the filling unit, when the detection signal is present, with an adjustable delay until filling unit operation actually ends.

17. The method of claim 9 further comprising:
the step of inserting test elements into the volumetric flow and testing the detection of the test element by means of the sensor unit.

\* \* \* \* \*